United States Patent [19]

Chase et al.

[11] Patent Number: 4,623,062

[45] Date of Patent: Nov. 18, 1986

[54] ANTITHEFT CONTAINER FOR A RECORDING MEDIUM AND METHOD FOR MANUFACTURING SAME

[75] Inventors: William Chase; Armand Martin, both of Biddeford, Me.

[73] Assignee: Shape Inc., Biddeford, Me.

[21] Appl. No.: 797,041

[22] Filed: Nov. 12, 1985

[51] Int. Cl.⁴ .................. B65D 65/12; B65D 85/57
[52] U.S. Cl. ................................ 206/311; 206/312; 206/444; 206/470; 206/807; 53/452
[58] Field of Search .......... 206/387, 444, 309, 310, 206/311, 312, 807, 470; 53/452, 453

[56] References Cited

U.S. PATENT DOCUMENTS

| | | | |
|---|---|---|---|
| 3,657,857 | 4/1972 | De Woskin et al. | 53/453 |
| 3,743,081 | 7/1973 | Roberg et al. | 206/387 |
| 3,860,248 | 1/1975 | Hunt et al. | 274/1 R |
| 3,942,639 | 3/1976 | Cournoyer et al. | 206/444 |
| 3,951,264 | 4/1976 | Heidecker et al. | 206/444 |
| 3,987,900 | 10/1976 | Tadokoro et al. | 206/313 |
| 4,030,138 | 6/1977 | Hillier | 360/135 |
| 4,038,693 | 7/1977 | Huffine et al. | 360/99 |
| 4,040,105 | 8/1977 | Slindee | 360/99 |
| 4,084,690 | 4/1978 | Pulse | 206/310 |
| 4,254,864 | 3/1981 | Mikura | 206/313 |
| 4,263,634 | 4/1981 | Chenoweth et al. | 360/133 |
| 4,294,640 | 10/1981 | Martinelli et al. | 156/213 |
| 4,327,831 | 5/1982 | Inaba et al. | 206/310 |
| 4,341,307 | 7/1982 | Shyers | 206/387 |
| 4,369,879 | 1/1983 | Egly et al. | 206/45.18 |
| 4,381,836 | 5/1983 | Rivkin et al. | 206/387 |
| 4,411,360 | 10/1983 | Gardineer, Jr. et al. | 206/313 |
| 4,417,291 | 11/1983 | Miklos et al. | 360/133 |
| 4,425,999 | 1/1984 | MacDonald et al. | 206/444 |
| 4,473,153 | 9/1984 | Colangelo | 206/312 |
| 4,479,579 | 10/1984 | Miklos | 206/309 |
| 4,488,645 | 12/1984 | Yamaguchi | 206/444 |
| 4,511,034 | 4/1985 | Pan | 206/310 |
| 4,558,782 | 12/1985 | Iverson et al. | 206/387 |

FOREIGN PATENT DOCUMENTS

| | | | |
|---|---|---|---|
| 2503667 | 10/1982 | France | 206/387 |
| 2091692 | 8/1982 | United Kingdom | 206/387 |

Primary Examiner—William Price
Assistant Examiner—Brenda J. Ehrhardt
Attorney, Agent, or Firm—Staas & Halsey

[57] ABSTRACT

An antitheft container for a compact digital, audio disc, including: a fold-over album having an outer flat sheet of die cut, thin, soft PVC material, an inner shell of thin, rigid vaccum formed PVC material with first and second square portions each having a rib formed therein for engagement with one another when the album is folded over and a middle insert of advertising literature sealed between the inner shell and the outer sheet; and a fold-over protector member having a vacuum-formed clear rigid PVC shell, also with a rib formed thereon, an extending flap and a hinge therebetween for folding the protector member. The front of the protector member temporarily engages the first portion of the inner shell via the complementary ribs, whereas the flap of the protector member folds over the outer sheet of the album. The side edges of the protector member extend beyond the side edges of the inner shell and the outer sheet to provide an area for sealing the shell of the protector member to the flap of the protector member, without being sealed directly to the album. The protector member, when sealed, prevents the album from being folded and shoplifted. An interference fit between the protector member and the album traps air, acts as a good insulator against extreme hot and cold and protects the disc stored in the album. After purchase, the consumer simply cuts along the sealed edges of the protector to remove the protector member, which is then discarded. Thereafter, the album can be opened and folded over repeatedly to provide the consumer with a convenient, reuseable, disc storage container. The invention also includes a method for manufacturing the above-described container.

26 Claims, 7 Drawing Figures

ANTITHEFT CONTAINER FOR A RECORDING MEDIUM AND METHOD FOR MANUFACTURING SAME

BACKGROUND OF THE INVENTION

This invention relates to a container for a recording medium and, more particularly, to an antitheft container for a compact, digital audio disc and a method for manufacturing same.

Containers are currently used to market and store recording media such as compact, digital audio discs. For example, U.S. Pat. No. 4,327,831, issued to INABA et al. describes a protective compact disc album including a rectangular, transparent sheet, half of which is adhered to the back of a first, square plate at three peripheral edges, and the other half of which is adhered to the back of a second, square plate at three peripheral edges. The remaining internal edges of the first and second plates are not adhered to the transparent sheet. As a result, a first pocket is formed between the first plate and the transparent sheet and a second pocket is formed between the second plate and the transparent sheet. The first and second pockets are used to hold manually inserted, suitable advertising literature which can be seen through the transparent sheet.

The album described in the INABA et al. '831 patent can be folded to a size only slightly greater than the compact disc. Accordingly, when marketed, the folded album could easily be shoplifted. Eliminating such shoplifting is, of course, of major concern to compact disc retailers and manufacturers alike.

Antitheft containers have been developed in an attempt to discourage this shoplifting. For example, a popular antitheft container includes a three-part album having a colored, inner shell for holding the compact disc and a clear cover hinged to a clear base. Advertising literature is located between the base and the colored inner shell. The album may be held closed via a male and female detent lock. The folded album is then sealed in an elongated plastic cover which also may include advertising literature. The container is assembled using a shuttle or rotary table with pre-cut sheet stock and hand literature insertion. A hole is then formed at one end of the elongated plastic cover for racking purposes. This elongated plastic cover is about twice the size of the folded album, thus making shoplifting of the album difficult. The entire package is intended to be opened only after purchasing.

Another particularly popular container uses an album which is "shrink-wrapped" with plastic. Again, the shrink wrap is intended to be removed only after purchasing. However, when the container is displayed in a store, it can be folded over by a shoplifter and concealed. Alternatively, the shrink wrap can easily be removed in the store and the album shoplifted.

Although the prior art antitheft containers described above eliminate some of the problems inherent in this art, they still do not teach an antitheft container for a recording medium, such as a compact disc, and a method for manufacturing same providing the most cost-efficient production, the most time-efficient, automated assembly, the greatest marketing appeal and the most effective theft prevention.

SUMMARY OF THE INVENTION

Accordingly, it is an object of the present invention to provide a container for a recording medium which effectively prevents theft.

It is another object of the present invention to provide an antitheft container for a recording medium allowing advertising literature to be viewed from all sides.

It is another object of the present invention to provide an easy to manufacture, antitheft container for a recording medium.

It is another object of the present invention to provide an antitheft container for a recording medium capable of displaying a title thereon.

It is another object of the present invention to provide an antitheft container for a recording medium with improved retail "racking" capability.

It is another object of the present invention to provide an antitheft container for a recording medium which avoids the use of conventional shrink wraps or multi-colored chipboard boxes.

It is another object of the present invention to provide an album for a recording medium which easily opens and closes via an interference fit and traps air within the album to act as a good insulator against extreme hot and cold and to cushion the recording medium against damage.

It is another object of the present invention to provide an antitheft container for a recording medium and method for manufacturing same which can be fully automated, including the advertising literature insertion step.

It is another object of the present invention to provide an antitheft container for a recording medium and method for manufacturing same, including fewer component parts and steps, respectively, than the conventional, antitheft containers and methods for manufacturing same.

To achieve the foregoing and other objects of the present invention and in accordance with the purposes of the invention, there is provided the following antitheft container for a recording medium; and, more particularly, for a compact, digital, audio disc and method for manufacturing same.

The container includes: (a) a fold-over album having (i) an outer flat sheet of thin, soft, polyvinyl chloride (PVC) material, (ii) an inner shell of thin, rigid, PVC material with first and second, square portions defined by respective ribs for engagement with one another when the album is folded over, the first portion being configured to receive a compact disc, and (iii) a middle advertising literature insert sealed between the inner shell and the outer sheet; and (b) an independent fold-over protector member having a clear, rigid, PVC shell with a rib complementary to the rib formed on the first portion of the fold-over album inner shell and an extending flap, the protector member being integrally hinged therebetween for folding in half. The shell of the protector member is temporarily engaged to the first portion of the fold-over album inner shell via the complementary ribs and the flap of the protector member is folded against the outer shell. The side edges of the protector member extend beyond the side edges of the inner shell and the outer sheet to provide an area for sealing, such as by radio frequency or impulse sealing, of the shell of the protector member to the flap of the protector member, without actually being sealed to the album. The protector member, when sealed, prevents the album from being folded and shoplifted and also protects the compact disc stored in the first portion of the album. After the purchaser removes and discards the protector member, the album can be repeatedly opened and closed to provide the consumer with a convenient reuseable disc storage container.

The method includes the steps of: fabricating an album including the outer, flat sheet, the inner shell having two portions, each with a rib for engagement with one another when folded over and a middle insert of advertising literature sealed between the inner shell and the outer sheet; forming a protector member having the shell, extending flap, and hinged area for folding the protector member in half; temporarily engaging the shell of the protector member to the first portion of the album via the complementary ribs; folding the flap of the protector member over the outer sheet; and sealing the side edges of the protector member extending beyond the side edges of the inner shell and the outer sheet.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The preferred embodiment of the present invention will now be described with reference to FIGS. 1–7.

Figure 1:
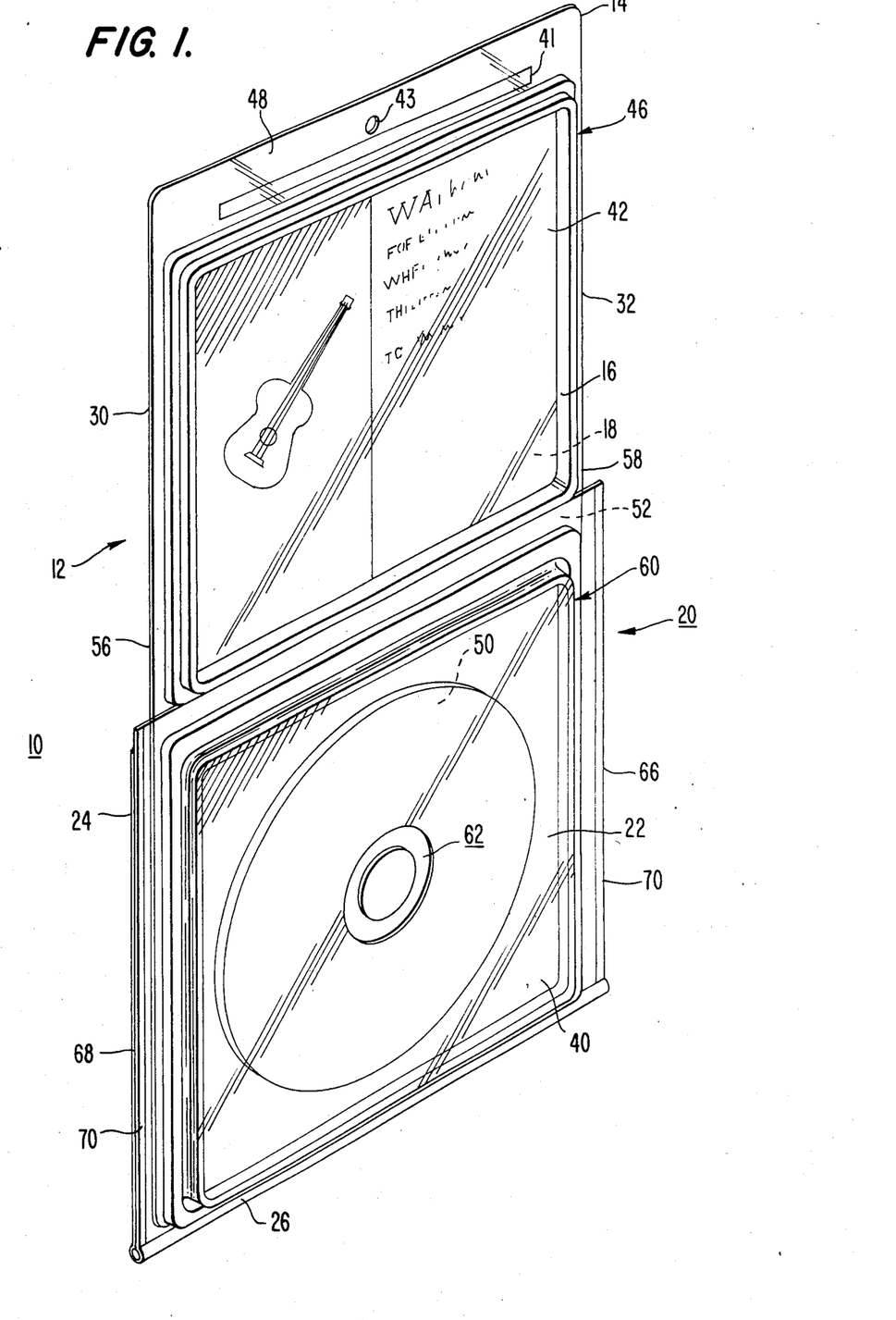
FIG. 1 is a perspective view of the antitheft container for a recording medium according to the present invention.

The preferred embodiment of the antitheft container for a recording medium according to the present invention is shown in FIG. 1 and is indicated by reference numeral 10. The container 10 generally includes: an album 12 having an outer sheet 14, an inner shell 16 and a middle insert 18 sealed between the outer sheet 14 and the inner shell 16; and a fold-over protector member 20 having a shell 22 and an extending flap 24, the protector member 20 being integrally hinged at area 26 for folding the shell 22 relative to the flap 24.

More particularly, the outer sheet 14 is preferably made of a flat, thin, soft, clear PVC material. The outer sheet 14 is preferably a 12 inch long by 5⅝ inch wide rectangle of 0.010 to 0.020 inch thickness.

Figure 2:
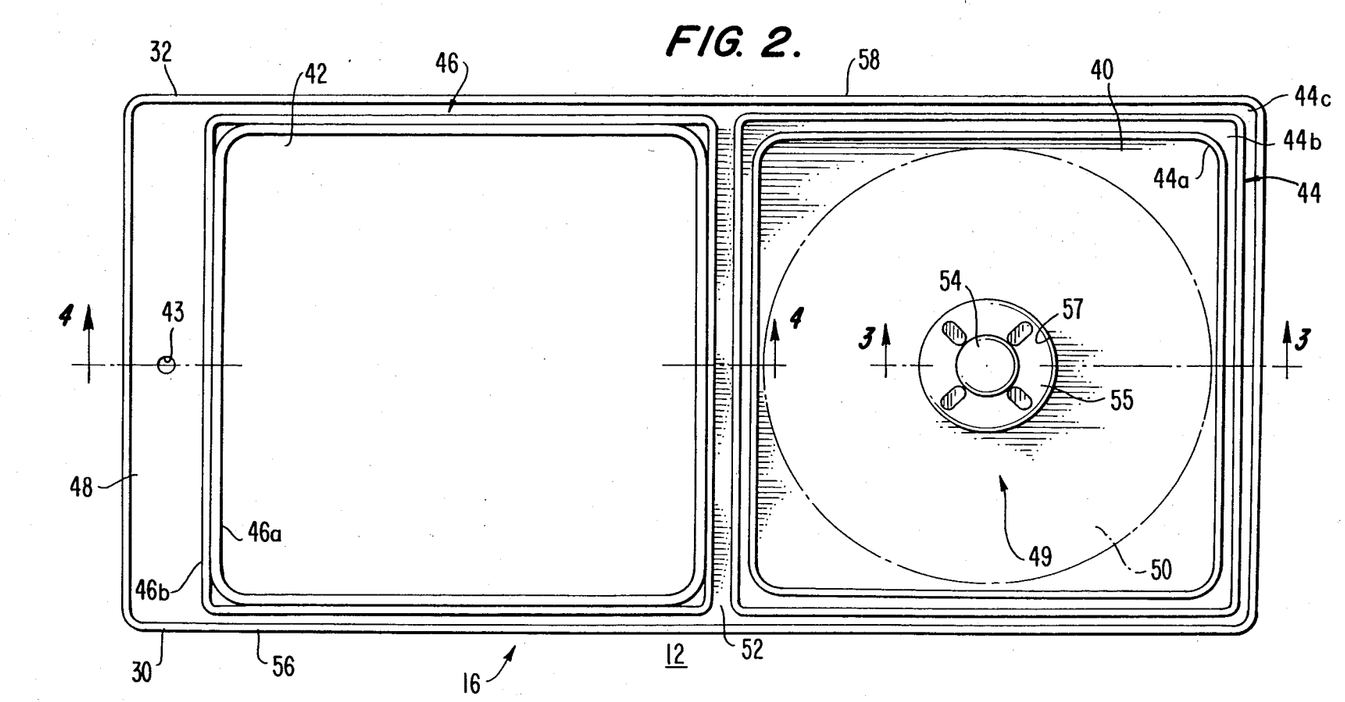
FIG. 2 is a top plan view of the album of the antitheft container for a recording medium according to the present invention.
Figure 3:
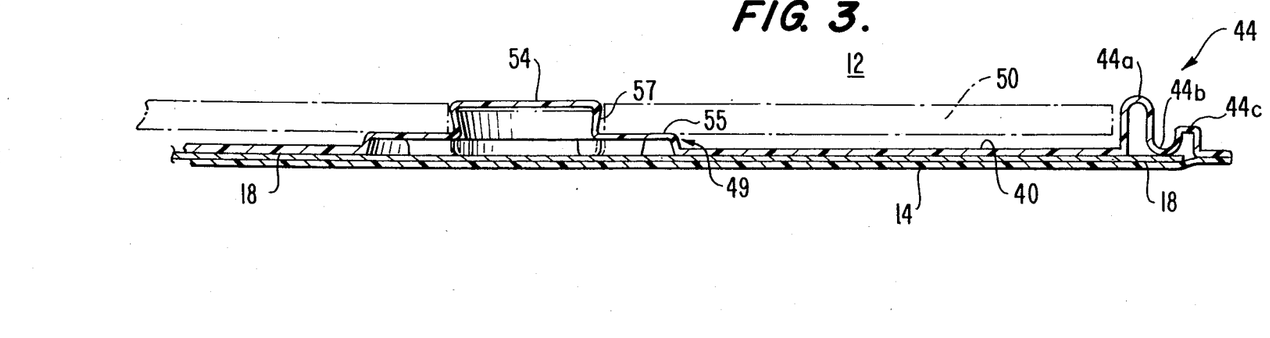
FIG. 3 is a partial, cross-sectional view of the album of the antitheft container for a recording medium according to present invention taken along the lines of 3—3 of FIG. 2.
Figure 4:
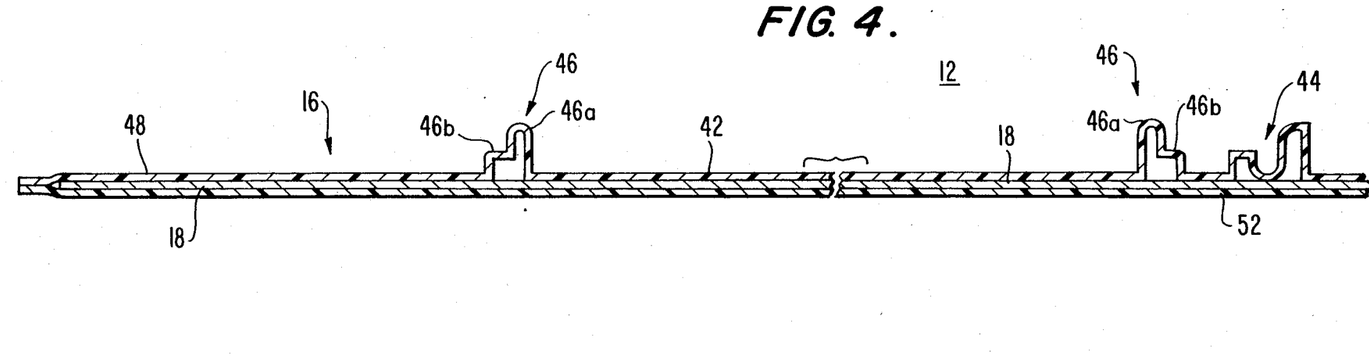
FIG. 4 is a cross-sectional view of the album of the antitheft container for a recording medium according to the present invention taken along lines 4—4 of FIG. 2.

As best seen in FIGS. 2, 3, and 4, the inner shell 16 is preferably made of thin, rigid, clear PVC material about 0.010 to 0.020 inch thick. The inner shell 16 is also of rectangular shape and comprises a first square portion 40 and a second, adjacent square portion 42. The first portion 40 is configured to receive the recording medium in an area 49. In this embodiment, the first portion 40 includes a hub 54 for receiving the central aperture 57 of a compact disc 50, and a concentric platform 55 to cushion and protect the compact disc 50 against damage. By this structure, the compact disc 50 edges and recording surfaces are safely spaced from any area of the album 12 which might damage the compact disc 50 during shipment, etc.

Each portion 40 and 42 is defined by mating means, i.e., ribs 44 and 46, respectively, formed on the inner shell 16. The rib 46 is a single or "male" rib, whereas the rib 44 is a double or "female" rib. Accordingly, when the inner shell 16 is folded, such that the first portion 40 is moved into opposing relation with the second portion 42, the male rib 46 is received by the female rib 44 to lock the album 12. The inner shell 16 has a hinge area 52 integrally formed between the first and second portions 40 and 42 which allows folding of the first portion 40 relative to the second portion 42.

The inner shell 16 also comprises a flange 48 extending from the second portion 42 which is used to show, e.g., the title 41 of the compact disc 50 printed on the middle insert 18. The flange 48 is also the location where an opening 43 is formed through the inner shell 16 and the outer sheet 14 which is used for racking purposes.

The middle insert 18 is preferably 0.005 to 0.060 thick cardboard, fiberboard, chipboard, or paper. If desired, the middle insert 18 may include a combination of separate pieces instead of one continuous piece. The middle insert 18 preferably includes advertising material such as color photographs of the performer, titles and duration of play of the songs, copyright notice, etc. on either or both sides thereof.

With the present invention, a new area is provided for displaying salient advertising. More particularly, the middle insert 18 can be clearly seen through the clear, first portion 40 when the unfolded album 12, including the protector member 20 thereon, is displayed on a retail rack. In addition, the compact disc 50 can be easily inspected by the prospective purchaser.

Figure 5:
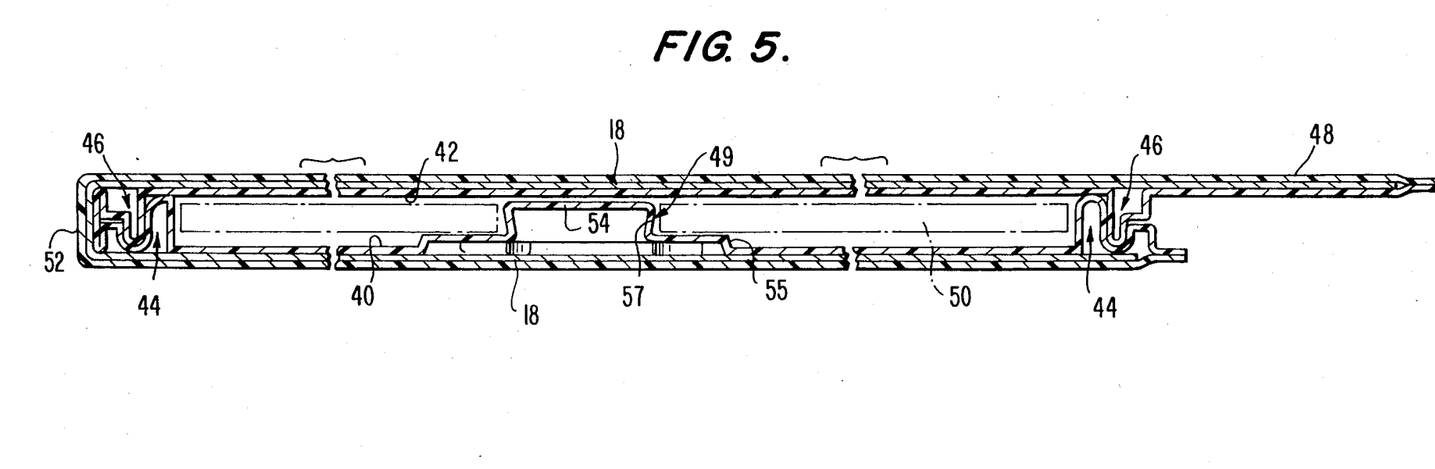
FIG. 5 is a side cross-sectional view of the folded album according to the present invention.

The second portion 42 of the album 12 can be folded against and engaged with the first portion 40 thereof to which the compact disc 50 is mounted. That is, the male rib 46 of the second portion 42 is capable of mating with the female rib 44 formed in the first portion 40 via an interference fit and vacuum, when the album 12 is folded in half. Interlocking of the ribs 46 and 44 creates an air pocket within the album 12 which acts as good insulator against hot and cold and cushions the compact disc 50 during shipping. More particularly, the hub 54 and platform 55 act to suspend the compact disc 50 within the album 12 to prevent damage thereto. The air trapped between the first portion 40 and the second portion 42 helps to absorb any shock incurred by the container 10 during shipment, storage, etc., and thus further prevents damage to the compact disc 50.

Figure 6:
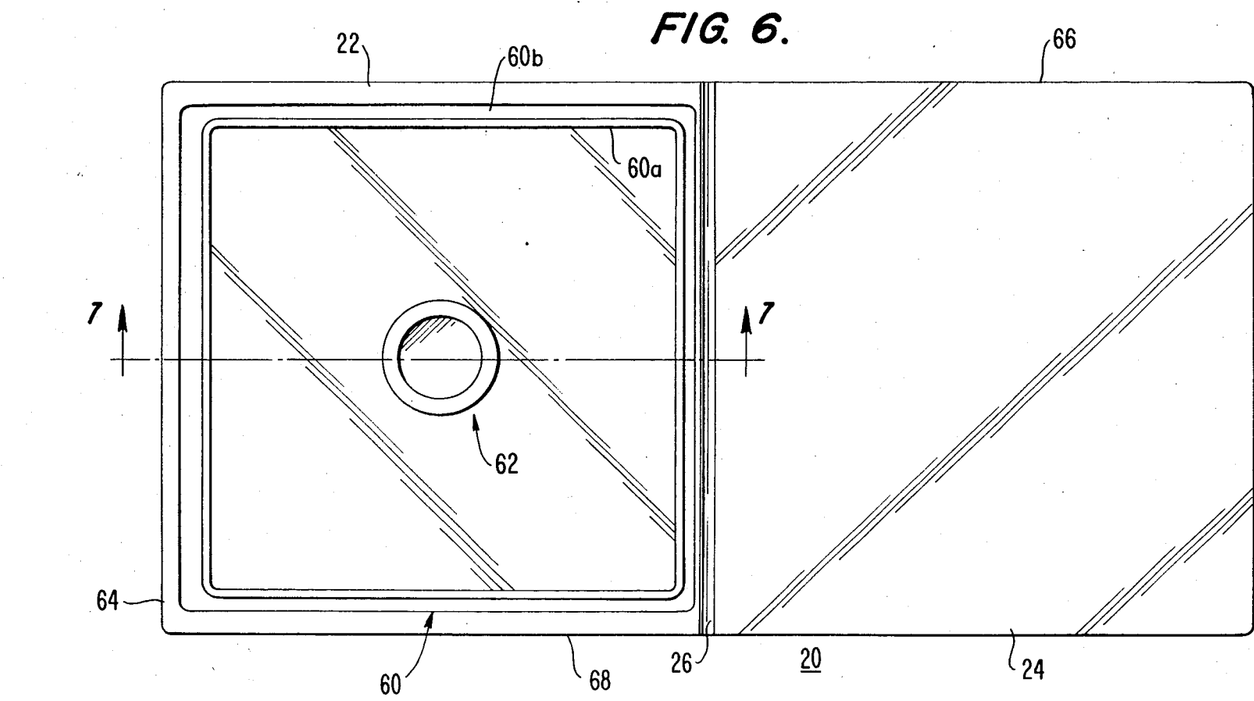
FIG. 6 is a top plan view of the protector member shell and flap of the antitheft container for a recording medium according to the present invention.
Figure 7:
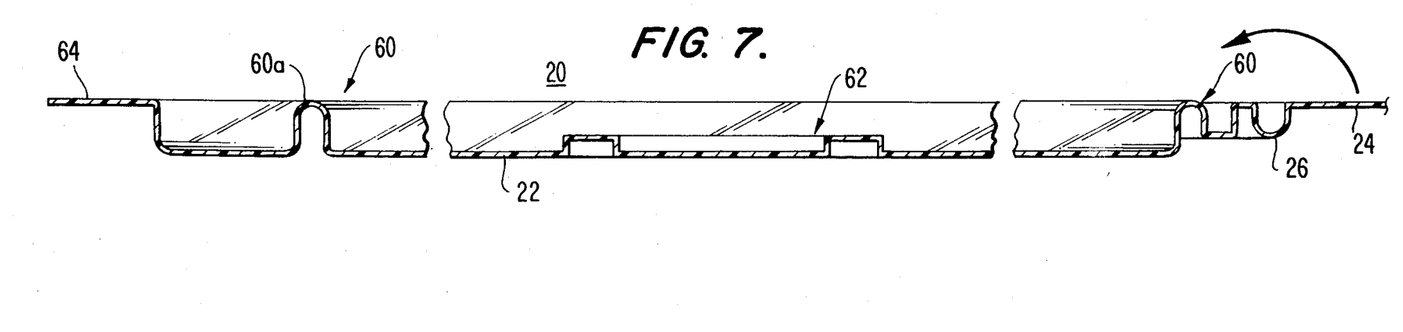
FIG. 7 is a cross-sectional view of the shell of the protector member taken along lines 7—7 of FIG. 6.

As best seen in FIGS. 6 and 7, the protector member 20 is preferably 0.015 thick and made of clear PVC. As stated above, the protector member 20 is preferably one-piece and includes a relatively rigid shell 22, a flap 24 and a hinge area 26 formed therebetween. The protector member 20 also has a hub 62 formed at the center of the shell 22. The hub 62 is configured to cooperate with the hub 54 and the platform 55 formed in the first portion 40 to cushion the compact disc 50 during shipping. More particularly, as suggested above, the hub 54 and platform 55 again act to suspend the compact disc 50 within the album 12 to prevent damage thereto. The air trapped between the first portion 40 and the engaged protector member 20 also helps to absorb any shock incurred by the container 10 during shipment, etc., and thus further prevents damage to the compact disc 50.

The shell 22 also includes a shelf 64 formed thereon which fits into the hinge area 52 of the album 12 to stiffen this area and prevent folding of the album 12 until the protector member 20 is removed.

The protector member 20 snaps over the first portion 40 of the open album 12 to which the compact disc 50 is mounted. That is, a mating means or "male" rib 60 is formed in the shell 22 of the protector member 20 substantially similar in configuration to the male rib 46 formed in the second portion 42 of the inner shell 16. Accordingly, the male rib 60 is capable of mating with the female rib 44 formed in the first portion 40, when the protector member 20 is attached thereto. Interlocking of the ribs 60 and 44 creates an air pocket between the protector member 20 and the first portion 40 of the inner shell 16 which acts as good insulator against hot and cold and cushions the compact disc 50 during shipping.

When the protector member 20 is temporarily engaged to the album 12, the side edges 66 and 68 of the protector member 20 extend beyond the side edges 56 and 58 of the album 12 to provide an area 70 for sealing, such as by radio-frequency or impulse sealing, of the shell 22 of the protector member 20 to the flap 24 thereof without actually being directly sealed to the album 12.

The protector member 20, when sealed, prevents the album 12 from being folded and also protects the compact disc 50 stored in the first portion 40 of the album 12 during shipment, storage and marketing. Accordingly, effective antitheft protection is provided by the present invention at the retail level. In addition, a new area is provided for displaying salient advertising. As stated above, the middle insert 18 advertising literature can be clearly seen through the clear, first portion 40 when the unfolded album 12, including the clear, protector member 20 thereon, is displayed on a retail rack. In addition, the compact disc 50 can also be easily inspected by the prospective purchaser.

After purchase, the consumer simply cuts along the edges 66 and 68 of the protector member 20 to remove the protector member 20 from the album 12, without damage to the separate album 12 itself. After removal and disposal of the protector member 20, the album 12 can be opened and folded repeatedly, providing the consumer with a convenient reuseable container 10 for storing the compact disc 50.

FIGS. 1–7 also illustrate the method for manufacturing the container 10, according to the present invention. This method generally includes the steps of: fabricating the above-described album 12 with the outer, flat sheet 14, the inner shell 16 having the first and second square portions 40 and 42, respectively, for engagement with one another when folded over and the middle insert 18 of advertising literature sealed between the inner shell 16 and the outer sheet 14; forming the protector member 20 with the shell 22, the extending flap 24 and a hinge area 26 therebetween for folding the protector member 20; temporarily engaging the protector member 20 via the ribs 60 and 44, to the first portion 40 of the album 12 to which the recording medium is attached; folding the flap 24 of the protector member 20 over the outer sheet 14 of the album 12; and sealing the side edges 66 and 68 of the protector member 20 to enclose the first portion 40 of the album 12.

More particularly, the inner shell 16 is first vacuum formed from a thin, rigid, clear or colored PVC material about 0.010 to 0.020 inches thick. The inner shell 16 should be formed to include the first square portion 42 and the mating means, i.e., the respective ribs 44 and 46. The inner shell 16 should also include the flange 48 and the hinge area 52 between the first and second portions 40 and 42, respectively. Finally, the inner shell 16 should include an area 49 for receiving the recording medium. In this embodiment, the hub 54 and platform 55 are formed for receiving a recording medium in the form of the compact disc 50.

The middle insert 18 is preferably made of 0.005 to 0.060 thick cardboard, fiberboard, chipboard or paper slightly smaller in outer dimensions than the outer sheet 14, i.e., about 11 and 13/16 inches×5 and 7/16 inches. The middle insert 18, preferably includes advertising information thereon via a conventional printing step and is placed on the inner shell 16 through an automated step.

The outer sheet 14 is then placed over the middle insert 18. The outer sheet consists of a thin, soft, clear PVC material about 0.010 to 0.020 inches thick. A colored PVC material can also be used.

The above-described parts can be assembled via an in-line roll fed assembly system. That is, an in-line roll fed inner shell 16 is vacuum and/or pressure formed out of thin, rigid, clear PVC material about 0.010 to 0.020 inches thick. An automatic literature insertion machine then inserts the middle insert 18. The outer sheet 14 is then introduced by means of an in line roll fed thin, soft, clear PVC material about 0.010 to 0.020 inches thick. The inner shell 16, the middle insert 18 and the outer sheet 14 are then indexed to a radio frequency sealing station and are sealed together as a unit. The sealing station will also, at the time of sealing, provide a tear seal around the perimeter of the seal. The entire unit is then indexed to another station for removal of the sealed album from the plastic web.

The rib 44 of the first portion 40 should preferably be formed to include a first semicircular member 44a opening toward the outer sheet 14 when assembled, an integral second semicircular member 44b disposed outwardly of the first semicircular member 44a opening away from the outer sheet 14 when assembled and an integral flat member 44c disposed outwardly of the second semicircular member 44b. The rib 46 of the second portion 42 should preferably be formed to include a semicircular member 46a opening toward the outer sheet 14 when assembled and an integral outwardly disposed flat member 46b.

The edges 56 and 58 of the inner shell 16 and the edges 30 and 32 of the outer sheet 14 are then connected via radio-frequency welding, heat sealing or any other conventional step.

The compact disc 50 is then mounted in the area 49 of the first portion 40 of the album 12 on the hub 54 and platform 55.

The protector member 20 is then independently, vacuum-formed from a one-piece, 0.015 thick, clear PVC material. The protector member 20 should be formed to include the hub 62 and the shelf 64 to stiffen the hinged area 26 of the album 12.

The mating means or rib 60 of the protector member 20 should be formed in the protector member 20 similar to the male rib 46 in the second portion 42 of the inner shell 16. That is, the rib 60 should preferably be formed to include a semicircular member 60a opening toward the outer sheet 14 when assembled and an integral outwardly disposed flat member 60b. As such, the rib 60 should be able to mate with the female rib 44 formed in the first portion 40.

The protector member 20 is then slid over the first portion 40 of the opened, flat album 12 to which the compact disc 50 has been attached. The shell 22 of the protector 20 is then locked to the front of the second portion 42 of the album 12 via an interference fit and via a vacuum formed when the male rib 60 is pushed into the female rib 44, thus evacuating air in the female rib 44. The flap 24 of the protector member 20 is then folded toward the rear of the first portion 40 against the outer sheet 14 of the album 12. The side edges 66 and 68 of the protector member 20 should be formed to extend beyond the side edges 56 and 58 of the inner shell 16 of the album 12 to provide an area 70 for sealing. The shell 22 of the protector member 20 is then sealed to the flap 24 of the protector member 20 at area 70, via, e.g. radio-frequency or impulse sealing, without being directly sealed to the album 12.

As can be understood from the above, there are a number of advantages over the prior art resulting from this invention, including: automated insertion of the middle insert of advertising literature; a capability of placing advertising on both sides of the middle insert, yielding improved exposure and marketability; locking of the fold-over album by means of both an interference fit and vacuum; providing a flange extending from the second portion of the album for title display and for store racking; protection of the album from theft by preventing folding over of the album prior to purchase; protection for the recording medium by an interference fit between the theft protector and the album which traps air and acts as a good insulator against extreme hot and cold during shipment, at the store level and while being stored by the consumer; and providing an efficient packaging system which does not rely on the use of additional conventional packaging, such a shrink-wrap and multi-colored chipboard boxes.

The foregoing is considered illustrative only of the principles of the invention. For example, although the above-description of the preferred embodiments relates particularly to application of the invention with compact audio discs, the present invention can also be applied as an antitheft container for other recording media, such as video discs, floppy discs and "45" records. Further, since numerous modifications and changes will readily occur to those skilled in the art, it is not desired to limit the invention to the exact construction and operation shown and described. For example, although the preferred embodiment described above is directed to a clear outer sheet, a clear inner shell and a clear protector member, various clear and/or color combinations can be used. Accordingly, all suitable modifications may be resorted to, falling within the scope of the invention and the appended claims and their equivalents.

We claim:

1. An antitheft container for a recording medium, comprising:
    (a) a foldable album, including—
        (i) an outer, substantially flat sheet,
        (ii) an inner shell having first and second means for mating when folded,
        (iii) a middle insert having advertising literature thereon sealed between the inner shell and the outer sheet; and
    (b) a protector member, including—
        (i) a rigid shell having third mating means substantially similar in configuration to the first means,
        (ii) a flap extending from the shell, and
        (iii) a hinge portion formed between the shell and the flap for folding the protector member,
    wherein, the shell of the protector member is temporarily engaged to the album via the third means mating with the second means, the flap of the protector member is folded against the outer sheet, and the side edges of the protector member extend beyond the side edges of the album and are sealed together.

2. The container as recited in claim 1, wherein the first means defines a first, square portion of the inner shell and the second means defines a second square portion of the inner shell.

3. The container as recited in claim 2, wherein the first square portion receives the recording medium.

4. The container as recited in claim 1, wherein the first means comprises: a male rib, including—
    (i) a semicircular member opening toward the outer sheet; and
    (ii) an integral outwardly disposed flat member.

5. The container as recited in claim 4, wherein the second means comprises: a female rib, including—
    (i) a first semicircular member opening toward the outer sheet;
    (ii) an integral second semicircular member disposed outwardly of the first semicircular member and opening away from the outer sheet; and
    (iii) an integral flat member disposed outwardly of the second semicircular member.

6. The container as recited in claim 5, wherein the third means comprises: a male rib, including—
    (i) a semicircular member opening toward the outer sheet; and
    (ii) an integral outwardly disposed flat member.

7. The container as recited in claim 1, wherein the outer sheet is made of clear, polyvinyl chloride.

8. The container as recited in claim 7, wherein the middle insert is made of cardboard.

9. The container as recited in claim 8, wherein the inner shell is made of clear, polyvinyl chloride.

10. An antitheft container for a compact disc, comprising:
    (a) a foldable album, including—
        (i) a one-piece, outer, substantially flat, clear sheet,
        (ii) an inner, clear, vacuum-formed shell having a first portion with first means for mating and a second portion with second means for mating, when the first portion is folded against the second portion,
        (iii) a middle insert having advertising literature thereon sealed between the inner shell and the outer sheet; and
    (b) a clear, one-piece, vacuum-formed protector member, including—

(i) a rigid shell having third mating means substantially similar in configuration to the first means,
(ii) a flap extending from the shell, and
(iii) a hinge portion formed between the shell and the flap for folding the protector member, wherein, the shell of the protector member is temporarily engaged to the first portion of the inner shell via the third means mating with the second means, the flap of the protector member is folded against the outer sheet, and the side edges of the protector member which extend beyond the side edges of the album are sealed together.

11. The container as recited in claim 10, further comprising:
a flange extending from the second portion of the inner shell for title display and in which an opening is formed for receiving a member of a retail rack.

12. The container as recited in claim 11, wherein the first and second means and second and third means, respectively, mate via an interference fit and vacuum.

13. A method for manufacturing an antitheft container for a recording medium, comprising the steps of:
(a) fabricating a foldable album, including—
(i) an outer, substantially flat sheet,
(ii) forming an inner shell having first means and second means for mating when folded, and
(iii) a middle insert of advertising literature thereon sealed between the inner shell and the outer sheet; and
(b) forming a protector member, including—
(i) a rigid shell having third mating means substantially similar in configuration to the first means,
(ii) a flap extending from the shell, and
(iii) a hinge portion formed between the shell and the flap for folding the protector member;
(c) temporarily engaging the protector member to the album such that the second and third means mate;
(d) folding the flap of the protector member against the album such that the protector member includes a portion of the album; and
(e) sealing together the side edges of the protector member extending beyond the side edges of the album.

14. The method as recited in claim 13, wherein the first means is formed to define a first, square portion of the inner shell and the second means is formed to define a second, square portion of the inner shell.

15. The method as recited in claim 14, wherein the first square portion is formed to receive the recording medium.

16. The method as recited in claim 15, wherein the first means is formed to comprise: a male rib, including—
(i) a semicircular member opening toward the outer sheet; and
(ii) an integral outwardly disposed flat member.

17. The method as recited in claim 16, wherein the second means is formed to comprise: a female rib, including—
(i) a first semicircular member opening toward the outer sheet;
(ii) an integral second semicircular member disposed outwardly of the first semicircular member opening away from the outer sheet; and
(iii) an integral flat member disposed outwardly of the second semicircular member.

18. The method as recited in claim 17, wherein the third means is formed to comprise: a male rib, including—
(i) a semicircular member opening toward the outer sheet; and
(ii) an integral outwardly disposed flat member.

19. The method as recited in claim 13, wherein the outer sheet is clear, polyvinyl chloride.

20. The method as recited in claim 19, wherein the middle insert is cardboard.

21. The method as recited in claim 20, wherein the inner shell is formed of clear, polyvinyl chloride.

22. A method for manufacturing an antitheft container for a compact disc, comprising the steps of:
(a) fabricating a foldable album, including—
(i) a one-piece, outer, substantially flat, clear sheet,
(ii) an inner, one-piece, vacuum-formed, clear shell having a first portion with first means for mating and a second portion with second means for mating, when the first portion is folded against the second portion, and
(iii) a middle insert of advertising literature thereon sealed between the inner shell and the outer sheet; and
(b) forming a one-piece, vacuum-formed, protector member, including—
(i) a rigid shell having third mating means substantially similar in configuration to the first means,
(ii) a flap extending from the shell, and
(iii) a hinge portion formed between the shell and the flap for folding the protector member;
(c) temporarily engaging the protector member to the first portion of the inner shell such that the second and third means mate;
(d) folding the flap of the protector member against the outer sheet; and
(e) sealing the side edges of the protector member which extend beyond the side edges of the album.

23. The method as recited in claim 22, wherein step (a) further comprises the substep of forming a flange extending from the second portion of the inner shell for title display and forming an opening in the flange for receiving a member of a retail rack.

24. The method as recited in claim 23, further comprising the step of:
(f) forming the first, second and third mating means such that mating between the first and third means and between the second and third means occurs via an interference fit and vacuum.

25. An antitheft container for a recording medium, comprising:
(a) a foldable album, including—
(i) an outer, substantially flat sheet, and
(ii) an inner shell having first and second means for mating together when folded; and
(b) a protector member, including—
(i) a rigid shell having third mating means substantially similar in configuration to the first means,
(ii) a flap extending from the shell, and
(iii) a hinge portion formed between the shell and the flap for folding the protector member, wherein, the shell of the protector member is temporarily engaged to the album via the third means mating with the second means, the flap of the protector member is folded against the outer sheet, and the side edges of the protector member extend beyond the side edges of the album and are sealed together.

26. A method for manufacturing an antitheft container for a recording medium, comprising the steps of:
(a) fabricating a foldable album, including—
  (i) an outer, substantially flat sheet, and
  (ii) an inner shell having first means and second means for mating together when folded; and
(b) forming a protector member, including—
  (i) a rigid shell having third mating means substantially similar in configuration to the first means,
  (ii) a flap extending from the shell, and
  (iii) a hinge portion formed between the shell and the flap for folding the protector member;
(c) temporarily engaging the protector member to the album such that the second and third means mate;
(d) folding the flap of the protector member against the album such that the protector member includes a portion of the album; and
(e) sealing together the side edges of the protector member extending beyond the side edges of the album.

* * * * *